United States Patent [19]

Hodes et al.

[11] Patent Number: 4,591,536
[45] Date of Patent: May 27, 1986

[54] PLAIN BEARING AND METHOD OF MANUFACTURE

[75] Inventors: Erich Hodes, Rosbach; Peter Lippok, Wiesbaden; Bernd Miotk, Essenheim, all of Fed. Rep. of Germany

[73] Assignee: Glyco Metall-Werke Daelen & Hofmann KG, Wiesbaden, Fed. Rep. of Germany

[21] Appl. No.: 656,437

[22] Filed: Oct. 1, 1984

[30] Foreign Application Priority Data

Oct. 1, 1983 [DE] Fed. Rep. of Germany ....... 3335716

[51] Int. Cl.⁴ .................. B32B 15/04; C22C 11/06
[52] U.S. Cl. .................. 428/643; 428/644; 428/645; 204/44.4; 308/DIG. 8; 420/571
[58] Field of Search ........... 428/643, 644, 645, 680, 428/684, 648, 926, 935, 677; 420/571; 204/43.1, 44.4; 29/149.55; 308/DIG. 8

[56] References Cited

U.S. PATENT DOCUMENTS

| | | | |
|---|---|---|---|
| 981,767 | 1/1911 | Jones | 420/571 |
| 1,359,194 | 11/1920 | Parkhurst | 420/571 |
| 1,364,051 | 12/1920 | Groff | 428/644 |
| 1,502,321 | 7/1924 | Müller | 420/571 |
| 1,568,224 | 1/1926 | Karafiat | 420/571 |
| 1,704,208 | 3/1929 | Palm | 420/571 |
| 1,731,021 | 10/1929 | Müller et al. | 420/571 |
| 1,771,899 | 7/1930 | Overall | 420/571 |
| 1,795,633 | 3/1931 | Abel | 420/571 |
| 2,198,240 | 4/1940 | Boegehold | 420/571 |
| 2,316,119 | 4/1943 | Bagley, Jr. | 308/237 |
| 2,459,172 | 1/1949 | Luetkemeyer et al. | 428/643 |
| 2,597,461 | 5/1952 | Ednie | 420/571 |
| 2,605,149 | 7/1952 | Schaefer et al. | 428/645 |
| 3,658,488 | 4/1972 | Brown et al. | 428/643 |
| 3,950,141 | 4/1976 | Roemer | 428/643 |
| 4,189,525 | 2/1980 | Mori | 428/643 |
| 4,206,268 | 6/1980 | Roemer et al. | 428/643 |
| 4,309,064 | 1/1982 | Fukuoka et al. | 308/DIG. 8 |
| 4,363,854 | 12/1982 | Hodes et al. | 428/643 |

FOREIGN PATENT DOCUMENTS

| | | | |
|---|---|---|---|
| 1161434 | 8/1951 | Fed. Rep. of Germany | 308/DIG. 8 |
| 2722144 | 11/1978 | Fed. Rep. of Germany | 420/571 |
| 5547 | 10/1894 | Sweden | 420/571 |
| 2783 | of 1870 | United Kingdom | 420/571 |
| 158562 | 2/1922 | United Kingdom | 420/571 |
| 577335 | 5/1946 | United Kingdom | . |
| 578020 | 6/1946 | United Kingdom | . |
| 628459 | 8/1949 | United Kingdom | . |
| 637154 | 5/1950 | United Kingdom | 204/43.1 |
| 2084191A | 4/1982 | United Kingdom | 204/44.4 |

OTHER PUBLICATIONS

*The Metallurgy of Lead,* Henry F. Collins, 2nd ed., Charles Griffen & Co. Limited, London, 1910, p. 8.
*Lead and Lead Alloys,* Wilhelm Hofmann, Lead Development Asso. London, 1970, pp. 163-171, 380-387.
*Useful Information About Lead,* First Ed., Lead Industries Asso., N.Y., 1931, pp. 22-25.
"Composition and Properties of Bearing Alloys-Table II", *Product Engineering*-Jun. 1942, p. 325.
"Wear in Lubricated Journal Bearings", Begelinger, A.; Chem. Abstracts, 90: 172956r, 1979.
"Application of a Running-In Coating on a Bearing", Latatver et al., Chem. Abstracts, 93: 122447s, 1980.
"Bearing for Combustion Engines", Fukuoka et al.; Chem. Abstracts, 95: 123005z, 1981.
*Lead-Tin-Antimony Plating* by R. T. Putnam and E. J. Roser presented at 42nd Annual AES Convention, Cleveland, O. 1955.

*Primary Examiner*—Melvyn J. Andrews
*Assistant Examiner*—John J. Zimmerman
*Attorney, Agent, or Firm*—Karl F. Ross; Herbert Dubno

[57] ABSTRACT

A plain bearing comprising a support and a galvanically deposited bearing alloy deposited on said support in a thickness of about 0.01 to 0.1 mm from a bath containing metallic fluoroborates. The bearing alloy is a copper-free alloy of only tin, antimony and lead and consisting essentially of 16 to 40% by weight tin, 8 to 11% by weight antimony and the balance lead. The support comprises a steel support covered with lead or tin-bronze and a nickel containing barrier layer.

9 Claims, 2 Drawing Figures

PLAIN BEARING AND METHOD OF MANUFACTURE

FIELD OF THE INVENTION

Our present invention relates to a plain or slide bearing of the type in which a bearing surface lies in direct surface contact with a member which rotates relative to this surface or with respect to which this surface moves. More particularly, the invention relates to a plain bearing which comprises a support upon which a layer of a bearing metal is deposited. The invention also relates to a method of making such a plain bearing.

BACKGROUND OF THE INVENTION

Plain or slide bearings can be distinguished from roller bearings by having a bearing surface which slidably engages an element upon relative displacement of the bearing and this element, e.g. relative rotation.

In the past, it has been proposed to provide a plain bearing with a support upon which a layer of a bearing metal is disposed.

Plain bearings can be flat, e.g. when they form a guideway for machine parts, but usually are round, e.g. in the form of a sleeve, and the bearing metal surface can be provided along the interior of this sleeve when a rotating shaft is to be journaled therein or, along an exterior of the sleeve, when the plain bearing is carried by the shaft and runs in a stationary member formed with a bore receiving the sleeve.

Typical of the plain bearings which have been provided heretofore are the plain bearings in which, upon the support or substrate, a bearing metal layer predominantly consisting of lead and tin as the alloying components, is galvanically deposited.

Plain bearings of this type have been used among others, e.g. in internal combustion engine systems in which considerable stress may arise. Indeed, in modern technology, plain bearings for internal combustion engine and automotive vehicle applications, by way of example, must be capable of withstanding a wide range of loadings, speeds and operating temperatures and, indeed, even extreme loads, speeds and temperatures.

Because of the bearing requirements and the severe conditions to which such bearings must be subjected, it has been recognized that a plain or slide bearing composed of a single material will generally not be suitable and hence plain bearings of two or more layers in the form of composites have been utilized.

By comparison with casting, sintering and cladding techniques which have all been utilized to form composite bearing structures, the galvanic or electroplating approach to producing a bearing metal layer upon a support, has a multitude of advantages.

For example, it is possible to make exceptionally thin and uniform alloy coatings with exceptionally fine surface properties. The fabrication of the composite bearing can be carried out with substantially less energy cost than classical casting methods. It is possible to utilize alloys which cannot be made with smelting techniques or can be made only with difficulty by such techniques because of, for example, a significant separation in the melting points of the alloying components. Finally, the galvanic or electroplating approach has the advantage that it allows application of alloys with precise dimensioning so that subsequent machining is not required.

As a consequence, multilayer bearings have been fabricated heretofore on a shell, sleeve or sleeve segment of steel to which a lead-bronze coating is applied by melt deposition, by galvanically depositing on the latter a diffusion barrier of nickel onto which bearing layers of PbSn, PbIn or PbSnCu can be applied.

Steel shells, aluminum alloy, nickel or copper or copper-zinc or coper-tin bonding layers, and lead-tin and lead-indium or lead-tin-copper bearing layers have been provided using galvanic technology.

German Pat. No. 844,664 discloses bearing layers of the following compositions:

| 1. Sn | 6.0 to 12% |
|---|---|
| Cu or Sb or As | 0.5 to 6% |
| Pb | balance |
| 2. Sn | 10% |
| Cu | 3% |
| Pb | balance |
| 3. Sn | 10% |
| Sb | 3% |
| Pb | balance |
| 4. Sn | 10% |
| As | 3% |
| Pb | balance |

These bearing layers are galvanically applied. They have, however, the disadvantage that their corrosion resistance and their fatigue resistance are relatively low. Experience has shown further than the adhesion of these bearing layers to the base metal is poor so that, even in German Pat. No. 844,664, it has been proposed to provide a silver intermediate layer to improve the adhesion.

In *Plating*, September 1955, pages 1133 to 1136, Puttmann and Roser have described galvanically deposited lead-tin-antimony coatings with 11% tin and 75% antimony which are deposited upon silver intermediate coatings. To the plating bath, hydroquinones and peptones can be added but without being capable of generating the minimum roughness which is required for high loading plain bearings.

Smart, in U.S. Pat. Nos. 2,373,352 and 2,423,624 describes galvanic indium layers to be especially advantageous with lead-bronze bearings in corrosive lubricating oils.

Plain bearings of lead and indium are in use today but have the disadvantage that in the fabrication the lead and indium must be deposited separately and hence the bearing must be subjected to a heat treatment in which diffusion occurs.

In recent years, the increased use of sulfur-containing lubricating oils in the operation of Diesel engines, for example, has resulted in increasing bearing deterioration because of the sulfuric residue which is formed and which accelerates corrosion. It is, therefore, important that the corrosion resistance of the bearing layer be enhanced.

Apart from good corrosion resistance, other important bearing layer requirements include:

1. Embedding ease or the tendency for the bedding layer to be able to allow penetration and capture of hard particles so that they will not remain in a position in which they can alter the lubricating gap and destroy the bearing surface by grooving the latter so that the oil film is interrupted.

2. Heat resistance and little tendency of heat to increase the wear. The bearing layer must be capable of retaining its strength with minimum fall-off as the temperature increases to the operating temperature and beyond.

3. Fit accommodation. This parameter is a measure of the ability of the surface of the bearing to accommodate itself to any contours or irregularities of the surface of the shaft during the initial phases of operation. While this is a reflection of yieldability of the bearing layer, the excessive softness or any limited cohesiveness will simply result in accelerating wear and will not be a true reflection of fit accommodation.

4. Resistance to attack upon or adhesion to the running surface of the element with which the bearing metal is juxtaposed. This parameter represents a low or zero-tendency for the bearing metal to adhere to or attack the aforementioned running surface.

5. Bond strength. By this parameter we refer to the strength of the bond between the bearing metal and the carrier or substrate, it being clear that the bearing metal must be bonded firmly to the support surface so that there is little tendency for the bearing metal to peel away.

6. Fatigue resistance. Under dynamic loading, the bearing layer must have sufficient fatigue resistance.

OBJECTS OF THE INVENTION

It is the principal object of the present invention to provide a plain bearing which has satisfactory properties as defined above and is especially recognized by a bearing layer having high corrosion resistance, high fatigue resistance or strength and excellent collateral properties of the type recited.

Another object of this invention is to provide an improved method of making a plain bearing having these properties.

SUMMARY OF THE INVENTION

We have surprisingly discovered that a particular galvanically applied bearing metal alloy whose main components are tin, antimony and lead can provide a remarkable improvement in corrosion resistance and wear resistance in a plain bearing application of the type described above.

Particularly, according to the invention, a plain bearing is constituted by a support, e.g. a steel shell upon which a bearing layer of galvanically applied bearing metal is coated, the latter consisting of a copper-free alloy of 16 to 40 weight percent tin, 8 to 11 weight percent antimony and a balance of lead.

Tests of corrosion resistance of such alloys as galvanically applied to steel substrates in plain bearings, according to the invention, carried out by immersion of samples in 10 weight percent sulfuric acid at a temperature of 100° C., show that the lead-tin-antimony alloys of the invention have a far greater corrosion resistance than the corrosion resistance possessed by the lead-tin-copper, lead-tin and lead-indium alloys of the prior art.

Furthermore, the alloys of the invention have a strikingly greater fatigue resistance by comparison with the commercial PbSn10Cu$^2$ bearing alloys. Indeed, German Pat. No. 27,22,144 teaches that the fatigue strength of such copper-containing galvanically deposited alloys, based upon lead, tin can be increased by an increase of the copper content and the tin content and the present invention has strikingly found that omission of the copper is a requisite for still greater improvement in the fatigue resistance. Especially when a combination of fatigue resistance and corrosion resistance is required, the alloys of the invention represent a major improvement over those described in this reference because the increase in copper content required to improve the wear resistance in the prior art also is accompanied by an increase in the tendency to corrode.

We have found, moreover, that as the copper content increases, the copper which coats the steel substrate tends to loosen the bond and can result in irregularities which can give rise to locally increased pressures at various points on the bearing layer which promote deterioration. All of these disadvantages are avoided with the claimed invention.

It is also known to provide cast alloys of lead, antimony and tin, so-called white metal, which have satisfactory wear resistance, but the requirement of fabrication by casting, coupled by the usual need to machine the bearing elements, has distinguished the method of our invention over this earlier approach.

Indeed, one of the surprising things about this invention is that it is possible to electrodeposit the lead-tin-antimony alloys of the invention in bearing metal layers having a high corrosion resistance and sufficient wear resistance.

Underwood tests with galvanic bearing coating on a lead-tin-antimony basis give results as found in the following table. In this table satisfactory dynamic fatigue resistance is demonstrated utilizing $6 \times 10^7$ loading cycles with no fatigue of the galvanic bearing coating. As a measure of the fatigue resistance, the pressure loading established during the loading cycles is given.

TABLE 1

| Type of bearing coating | Pb | Composition (weight %) Sn | Sb | Cu | Fatigue Resistance (N/mm$^2$) |
| --- | --- | --- | --- | --- | --- |
| PbSnSb known | balance | 10 | 2.5 | — | 52 |
|  | balance | 10 | 4.5 | — | 52 |
|  | balance | 10 | 10 | — | 52 |
| PbSnSb as per invention | balance | 16 | 8 | — | 57 |
|  | balance | 16 to 20 | 10 | — | 60 |
|  | balance | 35 to 40 | 10 | — | 70 |
| PbSnCu commercial | balance | 10 | — | 1 to 2 | 50 |

As can be seen from this table, the dynamic fatigue strength of the plain bearings of the invention is about 40% greater than those of plain bearings utilizing the known lead-tin-antimony bearing layer and the same bearing material having the PbSn10Cu2 bearing composition.

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

In a preferred embodiment of the invention the electrodeposited bearing layer consists of 35 to 40% by weight tin, 10% by weight antimony and the balance (50 to 55% by weight) lead. A highly effective composition, therefore, comprises about 37.5% by weight tin, 10% by weight antimony and 52.5% by weight lead.

Figure 1:
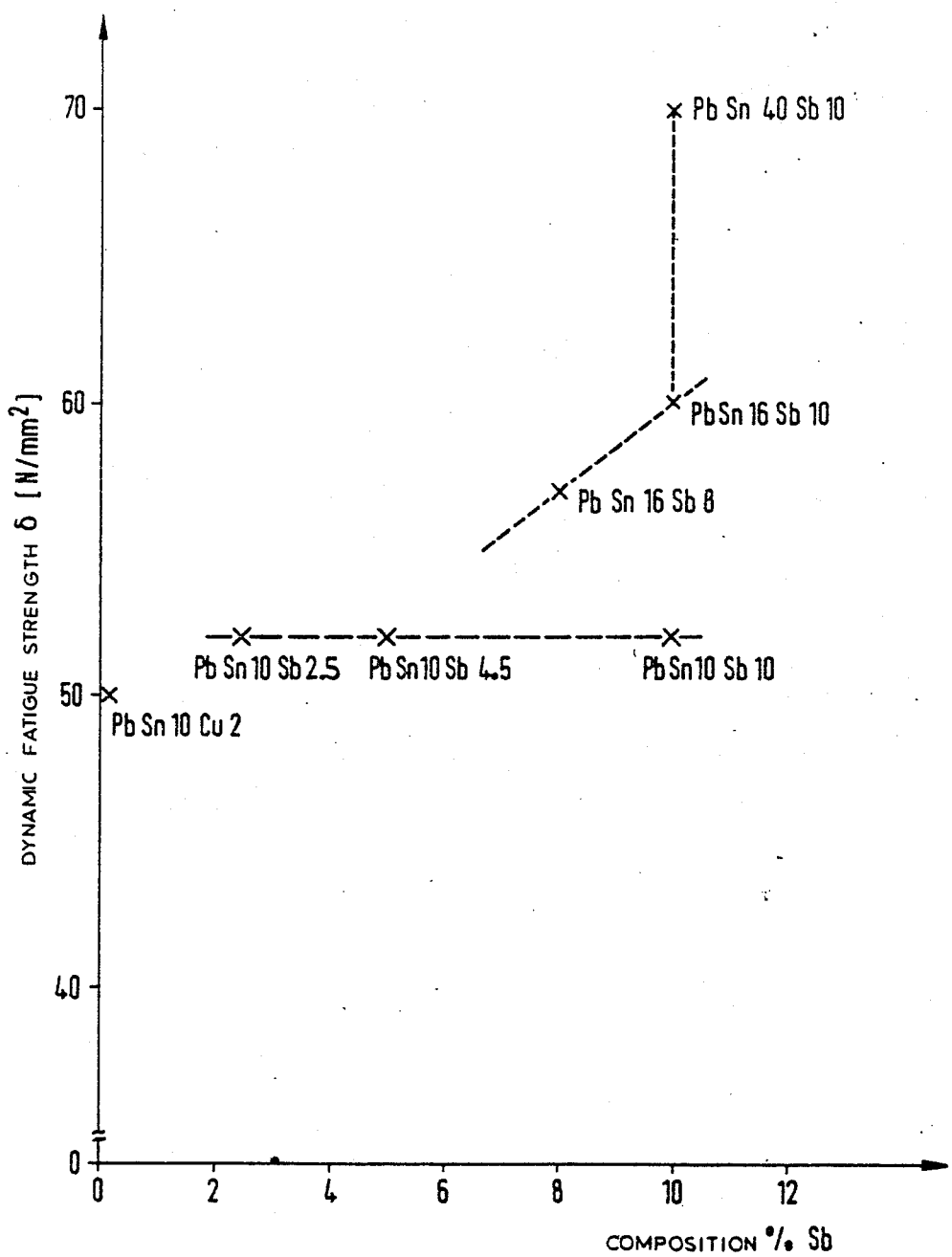
FIG. 1 is a graph in which dynamic fatigue strength is plotted along the ordinate versus proportion of antimony in weight/percent plotted along the abscissa for compositions in accordance with the invention and those which can be considered prior art or conventional.
Figure 2:
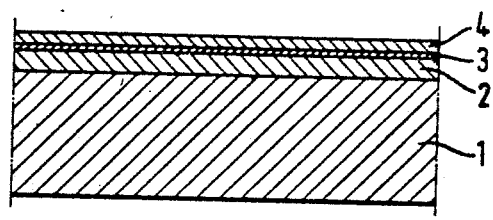
FIG. 2 is a cross-sectional view illustrating a plain bearing in cross section.

As can be seen from FIG. 1, such compositions have a significantly increased dynamic fatigue strength improvement with the improvement increasing for increased antimony content within the range of 8 to 11% according to the invention and with increasing tin content up to 40% by weight tin for any given antimony content within this range The diagram also shows that for the conventional amounts of tin in bearing alloys of say 10% by weight a dynamic fatigue strength is practically independent of the antimony content. However, with a tin content of 16 to 20% by weight, it is possible to increase the dynamic fatigue strength by increasing the antimony content with the most significant increase with a tin content of 35% to 40% by weight.

Upon the support body 1 an emergency bearing layer 2 can be applied, e.g. of lead or tin bronze to serve as an antifriction surface in the event the main bearing layer is worn through.

The intermediate layer 2 can be coated with a diffusion barrier 3 of nickel or a nickel-tin alloy, preferably an alloy consisting of 65% by weight tin and 35% by weight nickel. This diffusion barrier is applied galvanically and has a thickness of about 0.001 to about 0.006 mm. A galvanic coating of PbSn40Sb10 alloy is applied as a bearing layer 4 in thickness of 0.01 to 0.1 mm.

The intermediate layer 2 can be composed also of an aluminum layer with emergency running characteristics, especially an aluminum-tin or aluminum-lead suspension alloy. Instead of the bearing alloy or in addition thereto, we can provide a nickel or copper or copper-zinc alloy or even a copper-tin alloy to which the bearing alloy may be more readily adherent. Instead of the bearing alloy PbSn40Sb10, the alloy PbSn20Sb10 according to the invention may be provided.

The galvanic electronic deposition of the bearing alloy is effected by cathodic electrolysis in an aqueous electrolyte bath, preferably a fluoroborate bath at room temperature, the components of the alloy being applied to the bearing in the corresponding proportions as the respective fluoroborates.

We claim:

1. A plain bearing comprising a support and a galvanically deposited bearing alloy deposited on said support in a thickness of about 0.01 to 0.1 mm, said bearing alloy being copper-free alloy of only tin, antimony and lead and consisting essentially of 16 to 40% by weight tin, 8 to 11% by weight antimony and the balance lead.

2. The plain bearing defined in claim 1 wherein said alloy is an alloy of 35 to 40% by weight tin, 10% by weight antimony and the balance lead.

3. The plain bearing defined in claim 1 wherein said thickness is between 0.020 and 0.050 mm.

4. The plain bearing defined in claim 3 wherein said alloy consists essentially of 35 to 40% by weight tin, 10% by weight antimony, balance lead.

5. The plain bearing defined in claim 4 wherein said support is steel provided with a coating of tin or lead-bronze, and a barrier layer containing nickel onto which said bearing alloy is galvanically deposited.

6. A method of making a plain bearing which comprises the steps of:
galvanically depositing upon a support a bearing metal layer free from copper, composed only of tin, antimony and lead, and consisting of 16 to 40% by weight tin, 8 to 11% by weight antimony and the balance lead in a thickness of 0.01 mm to 0.1 mm.

7. The method defined in claim 6 wherein said thickness is 0.020 mm to 0.050 mm.

8. The method defined in claim 7 wherein the composition of said alloy is selected by incorporating corresponding metallic fluoroborates in corresponding concentrations in an electrolytic bath from which said alloy is galvanically deposited.

9. The method defined in claim 8 wherein said support is a steel support covered with lead or tin-bronze and a nickel containing barrier layer.

* * * * *